US012572088B2

(12) United States Patent
Shinozuka et al.

(10) Patent No.: US 12,572,088 B2
(45) Date of Patent: Mar. 10, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Masayuki Shinozuka, Chiba (JP); Koji Takahashi, Chiba (JP); Yasuo Kojima, Chiba (JP); Motoya Yamada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 411 days.

(21) Appl. No.: 18/306,758

(22) Filed: Apr. 25, 2023

(65) Prior Publication Data

US 2023/0350317 A1 Nov. 2, 2023

(30) Foreign Application Priority Data

Apr. 28, 2022 (JP) ................................ 2022-075301
Mar. 28, 2023 (JP) ................................ 2023-052161

(51) Int. Cl.
*G03G 5/10* (2006.01)
*G03G 21/18* (2006.01)

(52) U.S. Cl.
CPC ......... *G03G 5/102* (2013.01); *G03G 21/1814* (2013.01)

(58) Field of Classification Search
CPC ........................... G03G 5/102; G03G 21/1814
See application file for complete search history.

(56) References Cited

U.S. PATENT DOCUMENTS 8,457,528 B2 6/2013 Ochi
8,865,380 B2 10/2014 Noguchi
(Continued)

FOREIGN PATENT DOCUMENTS

JP 2000-47413 A 2/2000
JP 2004-109918 A 4/2004
(Continued)

OTHER PUBLICATIONS

U.S. Appl. No. 18/300,968, filed Apr. 14, 2023, Yasuo Kojima.
(Continued)

*Primary Examiner* — Mark F. Huff
*Assistant Examiner* — Boone Alexander Evans
(74) *Attorney, Agent, or Firm* — VENABLE LLP

(57) ABSTRACT

An electrophotographic photosensitive member comprises: a support having a cylindrical shape; and a photosensitive layer, wherein the support has a surface formed of Al and/or an Al alloy, and includes Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein a ratio of an area occupied by the Al crystal grain having the (α) to a total area of the surface of the support is 10% or less, and a ratio of an area occupied by the Al crystal grain having the (γ) to the total area of the surface of the support is more than 10%.

7 Claims, 3 Drawing Sheets

(56) References Cited

U.S. PATENT DOCUMENTS

| | | | | |
|---|---|---|---|---|
| 9,114,565 | B2 | 8/2015 | Kawai | |
| 9,389,521 | B2 | 7/2016 | Takahashi | |
| 9,766,561 | B2 | 9/2017 | Takahashi | |
| 9,772,596 | B2 | 9/2017 | Mitsui | |
| 10,042,273 | B2 | 8/2018 | Takahashi | |
| 10,338,486 | B2 | 7/2019 | Abe | |
| 10,429,754 | B2 | 10/2019 | Takahashi | |
| 10,558,132 | B2 | 2/2020 | Ishiduka | |
| 10,642,175 | B2 | 5/2020 | Ohira | |
| 11,112,707 | B2 | 9/2021 | Takahashi | |
| 11,506,988 | B2 | 11/2022 | Takahashi | |
| 12,181,832 | B2 * | 12/2024 | Takahashi | G03G 5/102 |
| 2016/0223925 | A1 * | 8/2016 | Tamemasa | G03G 5/102 |
| 2019/0384191 | A1 | 12/2019 | Kobayashi | |
| 2022/0276577 | A1 | 9/2022 | Takahashi | |
| 2022/0276578 | A1 | 9/2022 | Yamada | |
| 2022/0283522 | A1 | 9/2022 | Shinozuka | |

FOREIGN PATENT DOCUMENTS

| | | | |
|---|---|---|---|
| JP | 2009-150958 | A | 7/2009 |
| JP | 2017-111409 | A | 6/2017 |
| WO | 2019/077705 | A1 | 4/2019 |

OTHER PUBLICATIONS

U.S. Appl. No. 18/306,431, filed Apr. 25, 2023, Motoya Yamada.
U.S. Appl. No. 18/306,763, filed Apr. 25, 2023, Koji Takahashi.
Kobelnics, No. 28, vol. 14, Oct. 2005, pp. 1-3.
United Aluminum 3003 Alloy Data Sheet and Properties, pp. 1-6.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, a process cartridge including the electrophotographic photosensitive member, and an electrophotographic apparatus including the electrophotographic photosensitive member.

Description of the Related Art

In recent years, the diversification of the users of an electrophotographic apparatus has been advancing, and hence there has been a growing need for an electrophotographic photosensitive member that resists various storage conditions and usage environments.

In International Publication No. WO2019/077705, as a technology concerning an improvement in image quality, there is a description of a technology including setting the internal stress value of an electroconductive support within the range of from −30 to 5 MPa.

In Japanese Patent Application Laid-Open No. 2009-150958, as a technology of improving image quality from the viewpoint of accuracy, there is a description of a technology including heating an element tube made of an aluminum alloy at from 190 to 550° C. before its cutting.

In addition, in Japanese Patent Application Laid-Open No. 2017-111409, there is a description of a technology including setting the average area of the crystal grains of an Al alloy having specific composition to from 3 to 100 $\mu m^2$.

According to an investigation made by the inventors of the present disclosure, each of the electrophotographic photosensitive members described in International Publication No. WO2019/077705, Japanese Patent Application Laid-Open No. 2009-150958, and Japanese Patent Application Laid-Open No. 2017-111409 has involved a problem in that when the electrophotographic photosensitive member is used after its storage under a low-temperature or high-temperature environment, its photosensitive layer is liable to peel from its support.

Accordingly, an object of the present disclosure is to provide an electrophotographic photosensitive member, which can suppress the peeling of its photosensitive layer from its support even when used after its storage under a low-temperature or high-temperature environment.

SUMMARY OF THE INVENTION

The object is achieved by the present disclosure described below.

That is, an electrophotographic photosensitive member according to one aspect of the present disclosure is an electrophotographic photosensitive member comprising: a support having a cylindrical shape; and a photosensitive layer, wherein the support has a surface formed of Al and/or an Al alloy, wherein the surface of the support comprises Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein a ratio of an area occupied by the Al crystal grain having the (α) to a total area of the surface of the support is 10% or less, and a ratio of an area occupied by the Al crystal grain having the (γ) to the total area of the surface of the support is more than 10%.

In addition, a process cartridge according to another aspect of the present disclosure is a process cartridge including: the above-mentioned electrophotographic photosensitive member; and at least one unit selected from the group consisting of: a charging unit; a developing unit; and a cleaning unit, the process cartridge integrally supporting the electrophotographic photosensitive member and the at least one unit, and being removably mounted onto a main body of an electrophotographic apparatus.

In addition, an electrophotographic apparatus according to still another aspect of the present disclosure includes: the above-mentioned electrophotographic photosensitive member; a charging unit; an exposing unit; a developing unit; and a transferring unit.

Further features of the present disclosure will become apparent from the following description of exemplary embodiments with reference to the attached drawings.

DESCRIPTION OF THE EMBODIMENTS

The present disclosure is described in detail below by way of an exemplary embodiment.

The inventors of the present disclosure have made an investigation, and as a result, have found that in each of the technologies described in International Publication No. WO2019/077705, Japanese Patent Application Laid-Open No. 2009-150958, and Japanese Patent Application Laid-Open No. 2017-111409, a minute difference between the crystal orientations of the electroconductive support of the electrophotographic photosensitive member may cause a reduction in adhesiveness between the support and photosensitive layer of the electrophotographic photosensitive member at the time of the storage thereof under a low-temperature or high-temperature environment. Probably because of the foregoing, a coat has been liable to peel after the storage under the severe environment.

To solve the above-mentioned technical problem that has occurred in the related art, the inventors of the present disclosure have made an investigation on the crystal orientations of the surface of an aluminum-made support.

As a result of the above-mentioned investigation, the inventors have found that the use of the following electrophotographic photosensitive member according to the present disclosure can solve the above-mentioned technical problem.

That is, an electrophotographic photosensitive member according to the present disclosure is an electrophotographic photosensitive member comprising: a support having a cylindrical shape; and a photosensitive layer, wherein the support has a surface formed of Al and/or an Al alloy, wherein the surface of the support comprises Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein a ratio of an area occupied by the Al crystal grain having the (α) to a total area of the surface of the support is 10% or less, and a ratio of an area occupied by the Al crystal grain having the (γ) to the total area of the surface of the support is more than 10%.

In the present disclosure, for example, the term "plane at −15° or more and less than +15° with respect to a {111} orientation" refers to a crystal plane having a plane variation of −15° or more and less than +15° with respect to the {111} orientation in an aluminum crystal.

The inventors of the present disclosure have conceived the mechanism via which the above-mentioned configuration of the present disclosure can solve the above-mentioned technical problem in the related art to be as described below.

Figure 1A:
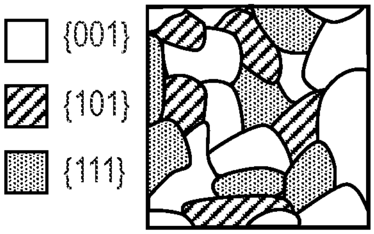
FIG. 1A is a view for illustrating a distribution of Al crystal grains.

Aluminum has the following three crystal orientations according to a broad classification: a {101} orientation, a {001} orientation, and a {111} orientation. As described in "Kobelnics" ([No. 28], Vol. 14, 2005. October), in general, for example, as illustrated in FIG. 1A, crystal grains having the respective crystal orientations are randomly distributed.

The inventors of the present disclosure have made the following assumption. The properties of thermal contraction slightly vary depending on the crystal orientations, and hence adhesiveness between the support and a coat resin for forming the photosensitive layer varies depending on the crystal orientations. Accordingly, the crystal grains each having a plane at −15° or more and less than +15° with respect to the {111} orientation, and the crystal grains each having a plane at −15° or more and less than +15° with respect to the {101} orientation each have high adhesiveness with the resin under a wider range of temperature and humidity conditions than the crystal grains each having a plane at −15° or more and less than +15° with respect to the {001} orientation do. The inventors have assumed that in particular, the crystal grains each having a plane at −15° or more and less than +15° with respect to the {111} orientation have high adhesiveness with the resin under an even wider range of temperature and humidity conditions than the crystal grains each having a plane at −15° or more and less than +15° with respect to the {001} orientation, and the crystal grains each having a plane at −15° or more and less than +15° with respect to the {101} orientation do.

In an aluminum-made support in the related art, crystal grains having three kinds of crystal orientations are present at random. Probably because of the foregoing, a minute difference in adhesiveness has occurred at an interface between the support and a coat to cause the peeling of the coat particularly under a storage environment in which a thermal strain is large.

Figure 1B:
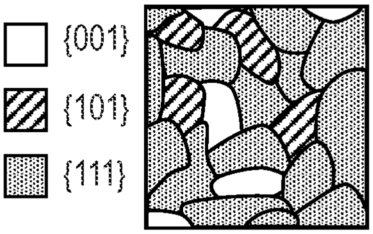
FIG. 1B is a view for illustrating a distribution of Al crystal grains.

In view of the foregoing, the surface of the aluminum-made support is formed under a state rich in the crystal grains each having a plane at −15° or more and less than +15° with respect to the {111} orientation, which are assumed to have high film adhesiveness, as illustrated in, for example, FIG. 1B. Probably as a result of the foregoing, the thermal strain of the surface of the aluminum-made support is suppressed to alleviate the minute difference in adhesiveness, and hence the peeling of the coat can be suppressed.

[Electrophotographic Photosensitive Member]

An electrophotographic photosensitive member according to the present disclosure includes a support having a cylindrical shape and a photosensitive layer.

An example of a method of producing the electrophotographic photosensitive member according to the present disclosure is a method including: preparing coating liquids for respective layers to be described later; applying the liquids in a desired layer order; and drying the liquids. In this case, examples of a method of applying each of the coating liquids include dip coating, spray coating, inkjet coating, roll coating, die coating, blade coating, curtain coating, wire bar coating, and ring coating. Of those, dip coating is preferred from the viewpoints of efficiency and productivity.

The support and the respective layers are described below.

<Support>

The electrophotographic photosensitive member according to the present disclosure includes a support having a cylindrical shape, and the surface of the support is formed of at least any one selected from Al and an Al alloy. In addition, the surface of the support may be subjected to, for example, hot water treatment, blast treatment, or cutting treatment.

(1) Crystal Orientation

An expression of an Al crystal orientation in the surface direction of the surface of the support in the present disclosure, for example, a plane of the {001} orientation represents an Al crystal plane with Miller indices. That is, the plane of the {001} orientation is the comprehensive expression of Miller indices representing any one of crystal lattice planes (001), (010), (100), (00-1), (0-10), and (−100).

In the present disclosure, the surface of the support includes Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and a ratio of an area occupied by Al crystal grains each having the (α) to a total area of the surface of the support is 10% or less, and a ratio of an area occupied by Al crystal grains each having the (γ) to the total area of the surface of the support is more than 10%.

From the viewpoint of increasing the plane of the support having a small thermal strain, the ratio of the area occupied by the Al crystal grains each having the (γ) is preferably 11% or more, more preferably 50% or more. Further, the ratio of the area occupied by the Al crystal grains each having the (γ) is more preferably 75% or more. In particular, when the ratio of the area occupied by the Al crystal grains each having the (γ) is 75% or more, the effect of the present disclosure can be more satisfactorily obtained.

In addition, from the viewpoint of reducing a plane having a large thermal strain, the ratio of the area occupied by the Al crystal grains each having the (α) is preferably 5% or less.

(Method of Measuring Crystal Orientations of Al Crystal Grains in Surface of Support)

In the present disclosure, the crystal orientations of the Al crystal grains in the surface of the support may be measured, for example, as described below.

First, the surface of the support is treated, for example, by buffing and with an aqueous solution of sodium hydroxide, and the measurement of the crystal orientations of the Al crystal grains is performed for points within 20 μm from the surface of the support before the treatment. The measurement of the crystal orientations is preferably performed by an SEM-EB SP method.

A Field Emission-Scanning Electron Microscope (FE-SEM) including an Electron Back Scatter diffraction Pattern (EBSP) detector is used for the measurement by the SEM-EBSP method. Herein, the "EBSP" refers to a Kikuchi pattern (Kikuchi lines) obtained from backscattered electrons occurring when an electron beam is allowed to enter the surface of a test piece, and the crystal orientations at the electron beam incidence position can be determined by analyzing the pattern. In addition, the "Kikuchi pattern" refers to a pattern that appears behind an electron diffraction image in a pair of white and black parallel lines, in a band shape, or in an array shape at the time of the scattering and diffraction of electron beams hit on a crystal.

For example, a field emission scanning electron microscope (product name: JSM-6500F, manufactured by JEOL Ltd.) may be used as the FE-SEM including the EB SP detector.

(2) Area Occupied by Al Crystal Grains in Surface of Support

In the present disclosure, the surface of the support includes Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and a ratio of an area occupied by the Al crystal grain having the (α) to a total area of the surface of the support is 10% or less, and a ratio of an area occupied by the Al crystal grain having the (γ) to the total area of the surface of the support is more than 10%.

The ratio of the area occupied by the Al crystal grains having each of the above-mentioned crystal orientations may be determined as described below.

Figure 2:
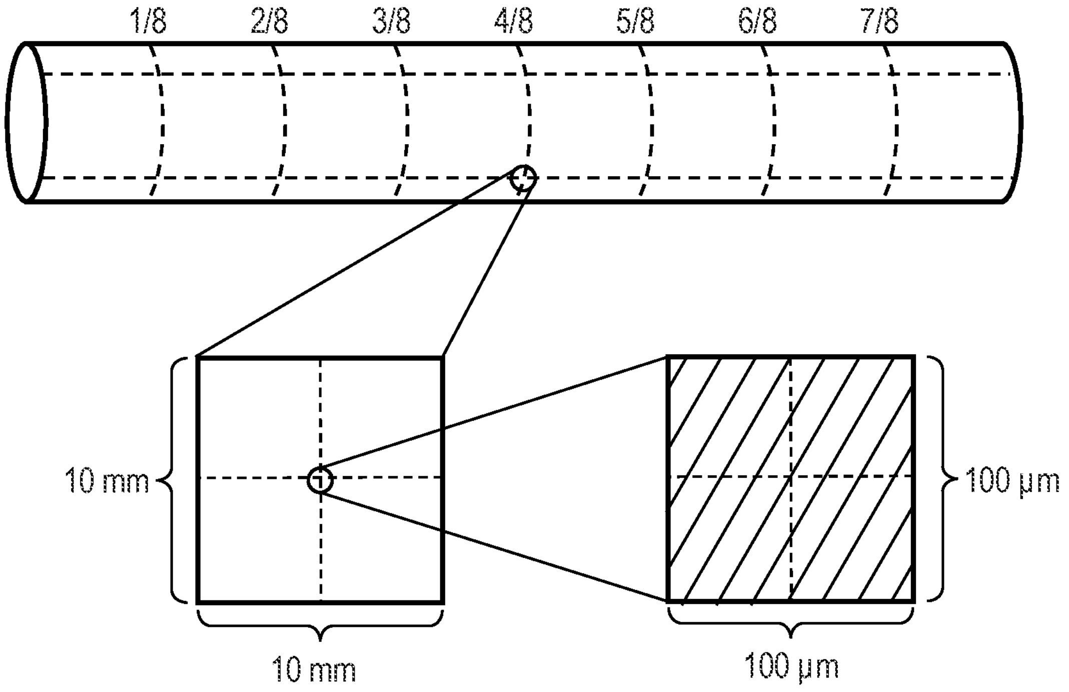
FIG. 2 is a view for illustrating the measurement position of an Al crystal grain.

As illustrated in FIG. 2, first, positions corresponding to ⅛, 2/8, 3/8, 4/8, 5/8, 6/8, and ⅞ of the full length of the support from one of the ends thereof in the axial direction thereof are determined. Further, at each of the positions, the support is divided into four parts of 90° each in the circumferential direction thereof. At each of the 28 points where the dividing lines in the axial direction and the dividing lines in the circumferential direction intersect, a 100-micrometer square region is set so that the point of intersection between the dividing line in the axial direction and the dividing line in the circumferential direction is at its center, and the measurement of the crystal orientations is performed in the measurement region by the above-mentioned SEM-EBSP method. Subsequently, for the Al crystal grains having the crystal orientations of (α), (β), and (γ), the area occupied by each orientation is calculated, and the resultant value is divided by 10,000 $\mu m^2$ to determine the ratio of the area occupied by the Al crystal grains having each crystal orientation in each region. Finally, the average of respective values obtained from the 28 regions is determined as the ratio of the area occupied by each of (α), (β), and (γ) in the support.

The area occupied by the Al crystal grains having each crystal orientation may be calculated using software included with the microscope. The area occupied by the Al crystal grains having each crystal orientation may be calculated by, for example, subjecting the orientations obtained through the measurement to hue mapping of the regions of the Al crystal grains having the respective crystal orientations in which the hue "h" of an HSV color space is used to determine the range of (α) to be $0 \leq h < 60$ and $300 \leq h < 360$, the range of (β) to be $60 \leq h < 180$, and the range of (γ) to be $180 \leq h < 300$.

(3) Al Alloy to be Used as Support

From the viewpoint of controlling the crystal orientations, the support is preferably a 3000 series Al alloy such as a JIS A3003 alloy or a 6000 series Al alloy such as a JIS A6063 alloy. The JIS A3003 alloy is specifically an Al alloy containing the following metals at the following ratios: 0.6 mass % or less of Si, 0.7 mass % or less of Fe, 0.05 to 0.2 mass % of Cu, 1.0 to 1.5 mass % of Mn, and 0.1 mass % or less of Zn. In addition, the JIS A6063 alloy is specifically an Al alloy containing the following metals at the following ratios: 0.2 to 0.6 mass % of Si, 0.35 mass % or less of Fe, 0.1 mass % or less of Cu, 0.1 mass % or less of Mn, 0.45 to 0.9 mass % of Mg, 0.1 mass % or less of Cr, 0.1 mass % or less of Zn, and 0.1 mass % or less of Ti.

(4) Method of Producing Support

A method of producing the support is not particularly limited as long as the method enables the production of a support that satisfies the requirement of the present disclosure.

An example of the method of producing the support is a method including the following four steps:

- a step of preparing a specific Al alloy, and a first step of subjecting the prepared Al alloy to hot extrusion processing to provide a molded body;
- a second step of subjecting the molded body obtained in the first step to cold drawing;
- a third step of annealing the resultant after the second step; and
- a fourth step of cutting the surface of the annealed product after the annealing.

When the crystal orientations are controlled through annealing, the crystal orientations can be controlled by adjusting a temperature increase rate, an annealing temperature, a maintenance time of the annealing temperature, and a cooling rate.

In particular, when the cooling rate is set to 5° C./min or more until the temperature of the support becomes 150° C., the appearance of the Al crystal grains each having the (α) crystal orientation on the surface is suppressed, and the Al crystal grains each having the (γ) crystal orientation easily appear on the surface. Accordingly, the ratio of the area occupied by the Al crystal grains each having the (α) crystal orientation in the surface of the support is reduced, and the ratio of the area occupied by the Al crystal grains each having the (γ) crystal orientation therein is increased.

Further, the crystal orientations are also changed by the temperature increase rate and the annealing temperature, and hence it is preferred that the crystal orientations be controlled so that the temperature increase rate is 40° C./min or less, and the annealing temperature is from 400 to 450° C.

In addition, it is preferred that the maintenance time of the annealing temperature be set to 1 hour or less.

In addition, a thermal history is important at the time of the control of the crystal orientations, and hence a product that has undergone the above-mentioned steps of performing hot extrusion processing and cold drawing is preferably annealed before use.

<Electroconductive Layer>

In the present disclosure, an electroconductive layer may be arranged on the support. The arrangement of the electroconductive layer can conceal flaws and irregularities in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated construction having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably from 1 to 500 nm, more preferably from 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer has a thickness of preferably from 1 to 50 μm, particularly preferably from 3 to 40 μm.

The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the electroconductive particles in the coating liquid for an electroconductive layer, there are given methods including using a paint shaker, a sand mill, a ball mill, and a liquid collision-type high-speed disperser.

<Undercoat Layer>

In the present disclosure, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has a thickness of preferably from 0.1 to 50 μm, more preferably from 0.2 to 40 μm, particularly preferably from 0.3 to 30 μm.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate-type photosensitive layer and (2) a monolayer-type photosensitive layer. (1) The laminate-type photosensitive layer is a photosensitive layer having a charge-generating layer containing a charge-generating substance and a charge-transporting layer containing a charge-transporting substance. (2) The monolayer-type photosensitive layer is a photosensitive layer containing both a charge-generating substance and a charge-transporting substance.

(1) Laminate-Type Photosensitive Layer

The laminate-type photosensitive layer includes the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably from 40 to 85 mass %, more preferably from 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer has a thickness of preferably from 0.1 to 1 μm, more preferably from 0.15 to 0.4 μm.

The charge-generating layer may be formed by preparing a coating liquid for a charge-generating layer containing the above-mentioned materials and a solvent, forming a coat thereof on the support or the electroconductive layer or on the undercoat layer, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

The content of the charge-transporting substance in the charge-transporting layer is preferably from 25 to 70 mass %, more preferably from 30 to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer has a thickness of from 5 to 50 μm, more preferably from 8 to 40 μm, particularly preferably from 10 to 30 μm.

The charge-transporting layer may be formed by preparing a coating liquid for a charge-transporting layer containing the above-mentioned materials and a solvent, forming a coat thereof on the charge-generating layer, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coat thereof on the support or the electroconductive layer or on the undercoat layer, and drying the coat. Examples of the charge-generating substance, the charge-transporting substance, and the resin are the same as those listed as the materials in the section "(1) Laminate-type Photosensitive Layer."

<Protective Layer>

In the present disclosure, a protective layer may be arranged on the photosensitive layer. The arrangement of the protective layer can improve durability.

The protective layer preferably contains electroconductive particles and/or a charge-transporting substance, and a resin.

Examples of the electroconductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protective layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has a thickness of preferably from 0.5 to 10 μm, more preferably from 1 to 7 μm.

The protective layer may be formed by preparing a coating liquid for a protective layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge according to the present disclosure is characterized in that the process cartridge integrally supports the electrophotographic photosensitive member described above and at least one unit selected from the group consisting of: a charging unit; a developing unit; and a cleaning unit, and is removably mounted onto the main body of an electrophotographic apparatus.

In addition, an electrophotographic apparatus according to the present disclosure is characterized by including the electrophotographic photosensitive member described above, a charging unit, an exposing unit, a developing unit, and a transferring unit.

Figure 3:
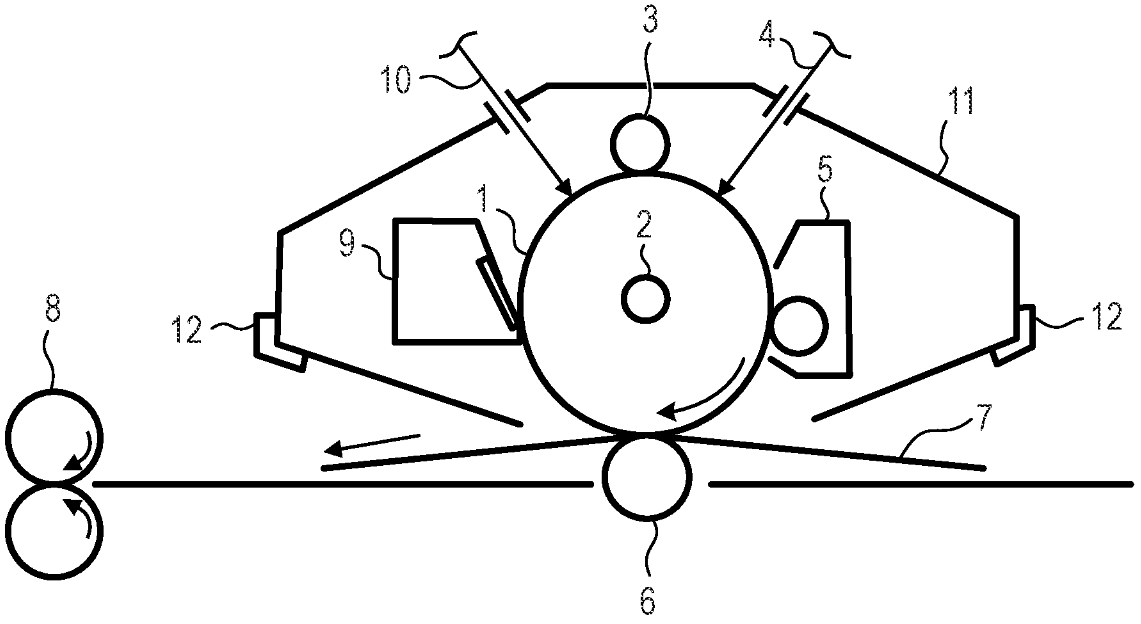
FIG. 3 is a view for illustrating an example of the schematic configuration of an electrophotographic apparatus including a process cartridge including an electrophotographic photosensitive member.

An example of the schematic configuration of an electrophotographic apparatus including a process cartridge including an electrophotographic photosensitive member is illustrated in FIG. 3.

An electrophotographic photosensitive member 1 having a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3.

Although a roller charging system based on a roller-type charging member is illustrated in FIG. 3, a charging system, such as a corona charging system, a contact charging system, or an injection charging system, may be adopted.

The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic apparatus.

The electrophotographic apparatus may include a cleaning unit 9 for removing a deposit such as the toner remaining on the surface of the electrophotographic photosensitive member 1 after the transfer. In addition, a so-called cleanerless system in which the deposit is removed with the developing unit 5 or the like without separate arrangement of the cleaning unit 9 may be used.

The electrophotographic apparatus may include an electricity-removing mechanism for subjecting the surface of the electrophotographic photosensitive member 1 to electricity-removing treatment with pre-exposure light 10 from a pre-exposing unit (not shown). In addition, a guiding unit 12 such as a rail may be arranged for removably mounting a process cartridge 11 according to the present disclosure onto the main body of the electrophotographic apparatus.

The electrophotographic photosensitive member according to the present disclosure can be used in, for example, a laser beam printer, an LED printer, a copying machine, a facsimile, and a multifunctional peripheral thereof.

EXAMPLES

The present disclosure is described in more detail below by way of Examples and Comparative Examples. The present disclosure is by no means limited to the following Examples, and various modifications may be made without departing from the gist of the present disclosure. In the description in the following Examples, "part(s)" is by mass unless otherwise specified.

[Production of Support]

A support was produced by the following method.

(Production Example of Support A-1)

An extruded tube formed of a JIS A3003 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, increased in temperature at a temperature increase rate of 5° C./min, and then maintained at 450° C. for 1 hour. Subsequently, the drawn tube was cooled at 15° C./min until its temperature became 150° C., and was removed from the electric furnace after 24 hours.

The surface of the tube was subjected to mirror cutting after the annealing. Thus, "Support A-1" having an outer diameter of 30.5 mm, an inner diameter of 28.5 mm, and a length of 370 mm was obtained. The production conditions of Support A-1 are shown in Table 1.

The elemental analysis of the drawn tube used showed that the tube was formed of an Al alloy containing 0.3 mass % of Si, 0.4 mass % of Fe, 0.1 mass % of Cu, 1.2 mass % of Mn, and 0.05 mass % of Zn.

(Production Examples of Supports A-2 to A-16)

Support A-2 to Support A-16 were each produced in the same manner as in the production example of Support A-1 except that in the production example of Support A-1, the same drawn tube was used, and the annealing conditions were changed as shown in Table 1.

(Production Example of Support A-17)

An extruded tube formed of a JIS A5005 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, increased in temperature at a temperature increase rate of 5° C./min, and then maintained at 450° C. for 1 hour. Subsequently, the drawn tube was cooled at 15° C./min until its temperature became 150° C., and was removed from the electric furnace after 24 hours.

The surface of the tube was subjected to mirror cutting after the annealing. Thus, "Support A-17" having an outer diameter of 30.5 mm, an inner diameter of 28.5 mm, and a length of 370 mm was obtained. The production conditions of Support A-17 are shown in Table 1.

The elemental analysis of the drawn tube used showed that the tube was formed of an Al alloy containing 0.25 mass % of Si, 0.3 mass % of Fe, 0.04 mass % of Cu, 0.1 mass % of Mn, 0.9 mass % of Mg, 0.06 mass % of Cr, 0.08 mass % of Zn, and 0.06 mass % of Ti.

(Production Example of Support A-18)

An extruded tube formed of a JIS A6063 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, increased in temperature at a temperature increase rate of 5° C./min, and then maintained at 450° C. for 30 minutes. Subsequently, the drawn tube was cooled at 15° C./min until its temperature became 150° C., and was removed from the electric furnace after 24 hours.

The surface of the tube was subjected to mirror cutting after the annealing. Thus, "Support A-18" having an outer diameter of 30.5 mm, an inner diameter of 28.5 mm, and a length of 370 mm was obtained. The production conditions of Support A-18 are shown in Table 1.

The elemental analysis of the drawn tube used showed that the tube was formed of an Al alloy containing 0.5 mass % of Si, 0.6 mass % of Fe, 0.2 mass % of Cu, 0.1 mass % of Mn, and 0.8 mass % of Zn.

(Production Examples of Support B-1 to Support B-12)

Support B-1 to Support B-12 were each produced in the same manner as in the production example of Support A-1 except that in the production example of Support A-1, the annealing conditions were changed as shown in Table 1.

(Production Examples of Support B-13 and Support B-14)

Annealing was performed with a drawn tube formed of an Al—Mg alloy containing 2.5 mass % of magnesium, the tube having an outer diameter of 30.8 mm, an inner diameter of 28.5 mm, and a length of 370 mm, under conditions shown in Table 1. After the annealing, the surface of the tube was subjected to mirror cutting. Thus, "Support B-13 and Support B-14" each having an outer diameter of 30.5 mm, an inner diameter of 28.5 mm, and a length of 370 mm were obtained. The production conditions of Support B-13 and Support B-14 are shown in Table 1.

TABLE 1

| Support | Aluminum alloy | Annealing condition: Temperature increase rate [° C./min] | Annealing temperature [° C.] | Maintenance time [hour(s)] | Temperature decrease rate [° C./min] |
|---|---|---|---|---|---|
| Support A-1 | 3003 | 5 | 450 | 1 | 15 |
| Support A-2 | 3003 | 5 | 435 | 1 | 15 |
| Support A-3 | 3003 | 5 | 435 | 0.5 | 15 |
| Support A-4 | 3003 | 5 | 425 | 1 | 15 |
| Support A-5 | 3003 | 7 | 435 | 1 | 10 |
| Support A-6 | 3003 | 7 | 435 | 0.5 | 15 |
| Support A-7 | 3003 | 10 | 435 | 0.8 | 15 |
| Support A-8 | 3003 | 10 | 435 | 0.5 | 10 |
| Support A-9 | 3003 | 15 | 435 | 0.5 | 10 |
| Support A-10 | 3003 | 15 | 405 | 1 | 10 |
| Support A-11 | 3003 | 20 | 440 | 1 | 5 |
| Support A-12 | 3003 | 40 | 435 | 1 | 15 |
| Support A-13 | 3003 | 5 | 450 | 1 | 20 |
| Support A-14 | 3003 | 5 | 450 | 1 | 30 |
| Support A-15 | 3003 | 5 | 450 | 1 | 40 |
| Support A-16 | 3003 | 5 | 450 | 1 | 50 |
| Support A-17 | 5005 | 5 | 450 | 1 | 15 |
| Support A-18 | 6063 | 5 | 450 | 0.5 | 20 |
| Support B-1 | 3003 | 5 | 360 | 2 | 5 |
| Support B-2 | 3003 | 5 | 550 | 2 | 5 |
| Support B-3 | 3003 | 5 | 250 | 4 | 5 |
| Support B-4 | 3003 | 5 | 400 | 2 | 5 |
| Support B-5 | 3003 | 5 | 220 | 1 | 5 |
| Support B-6 | 3003 | 5 | 210 | 0.5 | 5 |
| Support B-7 | 3003 | 5 | 200 | 2 | 5 |
| Support B-8 | 3003 | 5 | 300 | 2 | 5 |
| Support B-9 | 3003 | 2 | 200 | 2.5 | 2 |
| Support B-10 | 3003 | 2 | 550 | 2.5 | 2 |
| Support B-11 | 3003 | 5 | 430 | 2.5 | 7 |
| Support B-12 | 3003 | 5 | 435 | 2.5 | 7 |
| Support B-13 | Al—Mg alloy | 5 | 380 | 2 | 5 |
| Support B-14 | Al—Mg alloy | 5 | 420 | 2 | 5 |

<Production of Electrophotographic Photosensitive Member>

(Production Example of Photosensitive Member A-1)

Support A-1 was used as a support.

Next, 100 parts of zinc oxide particles (specific surface area: 19 $m^2/g$, powder resistivity: $3.6\times10^6$ Ω·cm) serving as a metal oxide were stirred and mixed with 500 parts of toluene, and 0.8 part of a silane coupling agent was added to the mixture, followed by stirring for 6 hours. The silane coupling agent used is N-2-(aminoethyl)-3-aminopropylmethyldimethoxysilane (product name: KBM-602, manufactured by Shin-Etsu Chemical Co., Ltd.). After that, toluene was evaporated under reduced pressure, and the residue was dried under heating at 130° C. for 6 hours to provide surface-treated zinc oxide particles.

Next, the following materials were prepared.

| | |
|---|---|
| A butyral resin (product name: BM-1, manufactured by Sekisui Chemical Company, Limited) serving as a polyol resin | 15 parts |
| A blocked isocyanate (product name: Sumidur 3175, manufactured by Sumika Bayer Urethane Co., Ltd.) | 15 parts |

Those materials were dissolved in a mixed solution of 73.5 parts of methyl ethyl ketone and 73.5 parts of 1-butanol. 80.8 Parts of the surface-treated zinc oxide particles and 0.8 part of 2,3,4-trihydroxybenzophenone (manufactured by Tokyo Chemical Industry Co., Ltd.) were added to the solution, and the mixture was subjected to dispersion with a sand mill apparatus using glass beads each having a diameter of 0.8 mm under an atmosphere at 23±3° C. for 3 hours.

Next, the following materials were prepared.

| | |
|---|---|
| A silicone oil (product name: SH28PA, manufactured by Dow Corning Toray Silicone Co., Ltd.) | 0.01 part |
| Crosslinked polymethyl methacrylate (PMMA) particles (product name: TECHPOLYMER SSX-102, manufactured by Sekisui Kasei Co., Ltd., average primary particle diameter: 2.5 μm) | 5.6 parts |

Those materials were added to the solution after dispersion, and the mixture was stirred to prepare a coating liquid for an undercoat layer.

The coating liquid for an undercoat layer was applied onto Support A-1 described above by dip coating, and the resultant coat was dried for 40 minutes at 160° C. to form an undercoat layer having a thickness of 18 μm.

Next, the following materials were prepared.

| | |
|---|---|
| A hydroxygallium phthalocyanine crystal (charge-generating substance) of a crystal form having peaks at Bragg angles 2θ ± 0.2° of 7.4° and 28.2° in CuKα characteristic X-ray diffraction | 20 parts |
| A calixarene compound represented by the following formula (A) | 0.2 part |

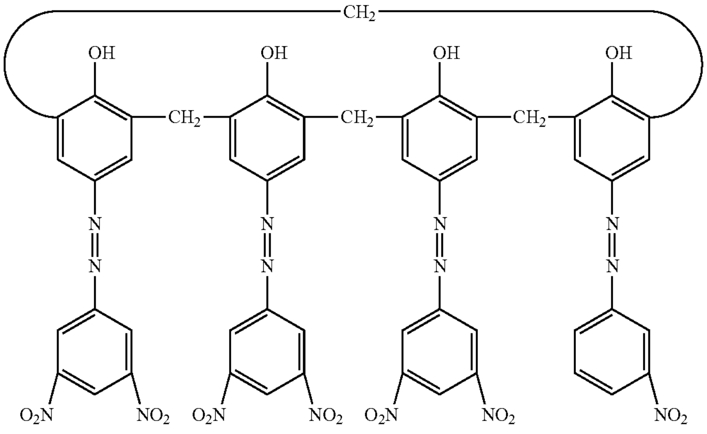

(A)

| | |
|---|---|
| Polyvinyl butyral (product name: S-LEC BX-1, manufactured by Sekisui Chemical Company, Limited) | 10 parts |
| Cyclohexanone | 600 parts |

Those materials were loaded into a sand mill using glass beads each having a diameter of 1 mm, and the mixture was subjected to dispersion treatment for 4 hours. After that, 700 parts of ethyl acetate was added to the dispersed product to prepare a coating liquid for a charge-generating layer. The coating liquid for a charge-generating layer was applied onto the undercoat layer by dip coating, and the resultant coat was dried for 15 minutes at 80° C. to form a charge-generating layer having a thickness of 0.17 μm.

Next, the following materials were prepared.

| | |
|---|---|
| A compound (charge-transporting substance) represented by the following formula (B) | 30 parts |
| A compound (charge-transporting substance) represented by the following formula (C) | 60 parts |
| A compound (charge-transporting substance) represented by the following formula (D) | 10 parts |

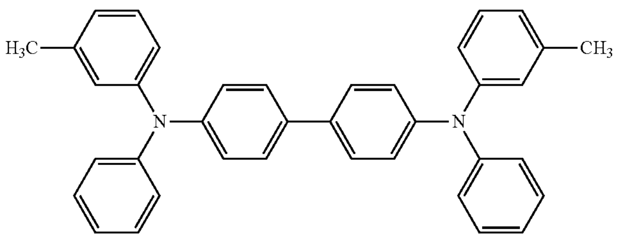

(B)

-continued

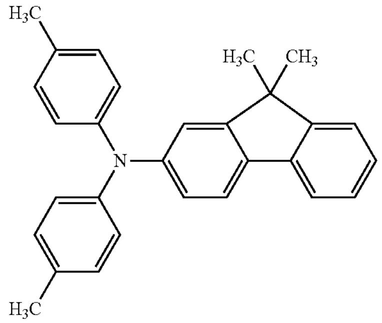

(C)

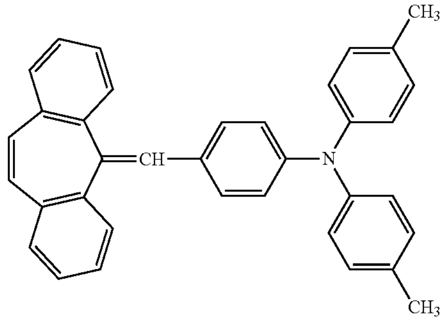

(D)

| | |
|---|---|
| A polycarbonate resin (product name: IUPILON Z400, manufactured by Mitsubishi Engineering-Plastics Corporation, bisphenol Z-type polycarbonate) | 100 parts |
| A polycarbonate resin having copolymerization units represented by the following structural formula (E-1) and the following structural formula (E-2) | 0.02 part |

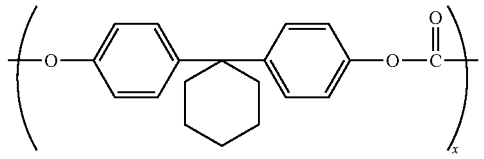

(E-1)

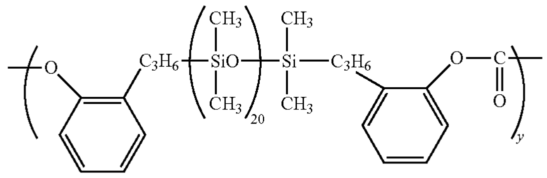

(E-2)

(x/y = 0.95/0.05: viscosity-average molecular weight Mv = 20,000)

Those materials were dissolved in a mixed solvent of 600 parts of mixed xylene and 200 parts of dimethoxymethane to prepare a coating liquid for a charge-transporting layer. The coating liquid for a charge-transporting layer was applied onto the charge-generating layer by dip coating to form a coat, and the resultant coat was dried for 30 minutes at 100° C. to form a charge-transporting layer having a thickness of 18 μm.

Next, a mixed solvent of 20 parts of 1,1,2,2,3,3,4-heptafluorocyclopentane (product name: ZEORORA H, manufactured by Zeon Corporation) and 20 parts of 1-propanol was filtered with a polyflon filter (product name: PF-040, manufactured by Advantec Toyo Kaisha, Ltd.).

In addition, the following materials were prepared.

| | |
|---|---|
| A hole-transportable compound represented by the following formula (F) | 90 parts |
| 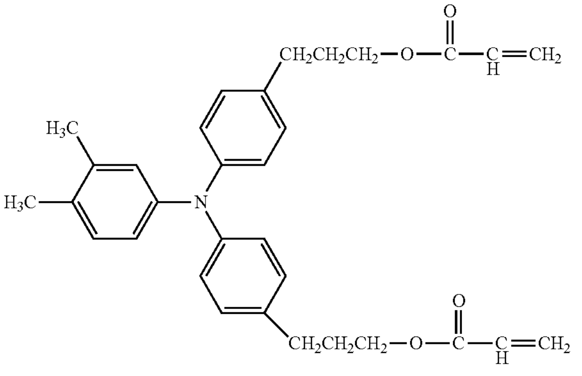 (F) | |
| 1,1,2,2,3,3,4-Heptafluorocyclopentane | 70 parts |
| 1-Propanol | 70 parts |

Those materials were added to the mixed solvent. The mixture was filtered with a polyflon filter (product name: PF-020, manufactured by Advantec Toyo Kaisha, Ltd.) to prepare a coating liquid for a second charge-transporting layer (protective layer). The coating liquid for a second charge-transporting layer was applied onto the charge-transporting layer by dip coating, and the resultant coat was dried in the atmosphere for 6 minutes at 50° C. After that, in nitrogen, the coat was irradiated with electron beams for 1.6 seconds under the conditions of an acceleration voltage of 70 kV and an absorbed dose of 8,000 Gy while the support (irradiation target body) was rotated at 200 rpm. Subsequently, the coat was heated by increasing its temperature from 25° C. to 125° C. in nitrogen over 30 seconds. The oxygen concentrations of the atmosphere at the time of the electron beam irradiation and at the time of the heating after the irradiation were each 15 ppm. Next, the coat was subjected to heating treatment in the atmosphere for 30 minutes at 100° C. to form a 5-micrometer thick second charge-transporting layer (protective layer) cured by the electron beams.

Next, a linear groove was formed on the surface of the protective layer with a polishing sheet (product name: GC3000, manufactured by Riken Corundum Co., Ltd.). The feeding speed of the polishing sheet was set to 40 mm/min, the number of revolutions of the product to be processed was set to 240 rpm, and the pressing pressure of the polishing sheet against the product to be processed was set to 7.5 $N/m^2$. The feeding direction of the polishing sheet and the rotation direction of the product to be processed were set to be the same direction. In addition, a backup roller having an outer diameter of 40 cm and an Asker C hardness of 40 was used. The linear groove was formed in the peripheral surface of the product to be processed under the foregoing conditions over 10 seconds.

Thus, Photosensitive Member A-1 was produced.

(Production Examples of Photosensitive Member A-2 to Photosensitive Member A-18, and Photosensitive Member B-1 to Photosensitive Member B-14)

Electrophotographic photosensitive members were each produced in exactly the same manner as in Photosensitive Member A-1 except that a support shown in Table 2 was used. The resultant electrophotographic photosensitive members are referred to as "Photosensitive Member A-2 to Photosensitive Member A-18, and Photosensitive Member B-1 to Photosensitive Member B-14."

[Evaluation]

Photosensitive Member A-1 was prepared, and a scratch test evaluation was performed as described below.

First, Photosensitive Member A-1 was stored under a high-temperature and high-humidity environment at 40° C. and 90% RH for 7 days, and was subsequently stored under a low-temperature and low-humidity environment at 5° C. and 20% RH for 7 days. After that, Photosensitive Member A-1 was transferred to a normal-temperature and normal-humidity environment at 23° C. and 50% RH, and the protective layer was removed with a polishing sheet, followed by the removal of the photosensitive layer with methyl ethyl ketone to expose the undercoat layer. Thus, a sample for a scratch test evaluation was obtained. Positions corresponding to 1/8, 2/8, 3/8, 4/8, 5/8, 6/8, and 7/8 of the full length of the sample for an evaluation from one of the ends thereof in the axial direction thereof were determined. Further, positions obtained by dividing the sample into four parts of 90° each in the circumferential direction thereof at each of the positions were determined. At each of the 28 points thus determined where the dividing lines in the axial direction and the dividing lines in the circumferential direction intersected, a square flaw 5 mm on a side was made with a cutter so that the point of intersection of the dividing line in the axial direction and the dividing line in the circumferential direction was at its center. Further, the inside of the square was flawed so as to be divided into 25 squares 1 mm on a side. After that, each square 1 mm on a side was rubbed with a pair of tweezers, and whether or not the square undercoat layer 1 mm on a side peeled from the support was observed. In the 25 divided squares 1 mm on a side in the square 5 mm on a side at each of the 28 points where the dividing lines in the axial direction and the dividing lines in the circumferential direction intersected, the number of the squares 1 mm on a side in each of which the undercoat layer peeled from the support was counted, and the average of the values at the 28 points was determined. A scratch test evaluation rank was determined in accordance with the average as described below.

A . . . 0 squares or more and less than 1 square

B . . . 1 square or more and less than 5 squares

C . . . 5 squares or more and less than 10 squares

D . . . 10 squares or more and less than 15 squares

E . . . 15 to 25 squares

Photosensitive Members A-2 to A-18, and Photosensitive Members B-1 to B-14 were each subjected to the same evaluation. The results are shown in Table 2.

Next, each of the 28 squares 5 mm on a side subjected to the above-mentioned evaluation was cut out as a fragment. After that, the undercoat layer was removed by buffing so that the surface of the support was exposed and subjected to mirror finishing. Next, the resultant was treated by being immersed in an aqueous solution of sodium hydroxide for 1 minute to provide a sample for crystal orientation observation.

Observation by the SEM-EBSP method was performed for a 100-micrometer square region set so that the center on the surface of the resultant sample, that is, the above-mentioned point of intersection between the dividing line in the axial direction of the support and the dividing line in the circumferential direction thereof was at its center, and the ratio of the area occupied by Al crystal grains having each crystal orientation was calculated. The results are shown in Table 2.

TABLE 2

| | Photosensitive member | Support | Area ratio of crystal grains having each orientation in 100-micrometer square region (α) | (β) | (γ) | Evaluation Scratch test rank |
|---|---|---|---|---|---|---|
| Example A-1 | Photosensitive member A-1 | Support A-1 | 4 | 20 | 76 | A |
| Example A-2 | Photosensitive member A-2 | Support A-2 | 3 | 18 | 79 | A |
| Example A-3 | Photosensitive member A-3 | Support A-3 | 2 | 17 | 81 | A |
| Example A-4 | Photosensitive member A-4 | Support A-4 | 3 | 27 | 70 | B |
| Example A-5 | Photosensitive member A-5 | Support A-5 | 3 | 33 | 64 | B |
| Example A-6 | Photosensitive member A-6 | Support A-6 | 7 | 13 | 80 | B |
| Example A-7 | Photosensitive member A-7 | Support A-7 | 6 | 16 | 78 | B |
| Example A-8 | Photosensitive member A-8 | Support A-8 | 7 | 20 | 73 | C |
| Example A-9 | Photosensitive member A-9 | Support A-9 | 8 | 30 | 62 | C |
| Example A-10 | Photosensitive member A-10 | Support A-10 | 8 | 45 | 47 | D |
| Example A-11 | Photosensitive member A-11 | Support A-11 | 7 | 67 | 26 | D |
| Example A-12 | Photosensitive member A-12 | Support A-12 | 8 | 81 | 11 | D |
| Example A-13 | Photosensitive member A-13 | Support A-13 | 4 | 49 | 47 | C |
| Example A-14 | Photosensitive member A-14 | Support A-14 | 4 | 15 | 81 | A |
| Example A-15 | Photosensitive member A-15 | Support A-15 | 3 | 12 | 85 | A |
| Example A-16 | Photosensitive member A-16 | Support A-16 | 2 | 6 | 92 | A |
| Example A-17 | Photosensitive member A-17 | Support A-17 | 4 | 81 | 15 | C |
| Example A-18 | Photosensitive member A-18 | Support A-18 | 9 | 7 | 84 | B |
| Comparative Example B-1 | Photosensitive member B-1 | Support B-1 | 32 | 33 | 35 | E |
| Comparative Example B-2 | Photosensitive member B-2 | Support B-2 | 36 | 31 | 33 | E |
| Comparative Example B-3 | Photosensitive member B-3 | Support B-3 | 37 | 30 | 33 | E |
| Comparative Example B-4 | Photosensitive member B-4 | Support B-4 | 26 | 39 | 35 | E |
| Comparative Example B-5 | Photosensitive member B-5 | Support B-5 | 33 | 33 | 34 | E |
| Comparative Example B-6 | Photosensitive member B-6 | Support B-6 | 33 | 33 | 34 | E |

TABLE 2-continued

| | Photosensitive member | Support | Area ratio of crystal grains having each orientation in 100-micrometer square region (α) | (β) | (γ) | Evaluation Scratch test rank |
|---|---|---|---|---|---|---|
| Comparative Example B-7 | Photosensitive member B-7 | Support B-7 | 31 | 30 | 39 | E |
| Comparative Example B-8 | Photosensitive member B-8 | Support B-8 | 39 | 31 | 30 | E |
| Comparative Example B-9 | Photosensitive member B-9 | Support B-9 | 33 | 33 | 34 | E |
| Comparative Example B-10 | Photosensitive member B-10 | Support B-10 | 26 | 36 | 38 | E |
| Comparative Example B-11 | Photosensitive member B-11 | Support B-11 | 31 | 14 | 55 | E |
| Comparative Example B-12 | Photosensitive member B-12 | Support B-12 | 27 | 15 | 58 | E |
| Comparative Example B-13 | Photosensitive member B-13 | Support B-13 | 11 | 79 | 10 | E |
| Comparative Example B-14 | Photosensitive member B-14 | Support B-14 | 9 | 82 | 9 | E |

According to the present disclosure, there can be provided the electrophotographic photosensitive member, which can suppress the peeling of its photosensitive layer from its support even when used after its storage under a low-temperature or high-temperature environment, and as a result, can suppress the blurring of a dot for forming an output image.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075301, filed Apr. 28, 2022, and Japanese Patent Application No. 2023-052161, filed Mar. 28, 2023 which are hereby incorporated by reference herein in their entirety.

What is claimed is:

1. An electrophotographic photosensitive member, comprising:

a support having a cylindrical shape; and a photosensitive layer;

the support having a surface comprising Al and/or an Al alloy, and comprising Al crystal grains having (α) a plane at −15° or more and less than +15° with respect to a {001} orientation, (β) a plane at −15° or more and less than +15° with respect to a {101} orientation, and (γ) a plane at −15° or more and less than +15° with respect to a {111} orientation, wherein a ratio of an area occupied by the Al crystal grain having the (α) to a total area of the surface of the support is 10% or less, and a ratio of an area occupied by the Al crystal grain having the (γ) to the total area of the surface of the support is 50 to 84%.

2. The electrophotographic photosensitive member according to claim 1, wherein the ratio of the area occupied by the Al crystal grain having the (γ) to the total area of the surface of the support is 11% or more.

3. The electrophotographic photosensitive member according to claim 1, wherein the ratio of the area occupied by the Al crystal grain having the (γ) to the total area of the surface of the support is 75% or more.

4. The electrophotographic photosensitive member according to claim 1, wherein the ratio of the area occupied by the Al crystal grain having the (α) to the total area of the surface of the support is 5% or less.

5. The electrophotographic photosensitive member according to claim 1, wherein the Al alloy contains 0.2 to 0.6 mass % Si.

6. A process cartridge, comprising:

an electrophotographic photosensitive member comprising a support having a cylindrical shape, and a photosensitive layer; and at least one unit selected from the group consisting of a charging unit, a developing unit and a cleaning unit;

the process cartridge integrally supporting the electrophotographic photosensitive member and the at least one unit, and being removably mounted onto a main body of an electrophotographic apparatus, wherein the support has a surface comprising Al and/or an Al alloy, and comprising Al crystal grains having (α) a plane at −15° or more and less than +15° with respect to a {001} orientation, (β) a plane at −15° or more and less than +15° with respect to a {101} orientation, and (γ) a plane at −15° or more and less than +15° with respect to a {111} orientation, and a ratio of an area occupied by the Al crystal grain having the (α) to a total area of the surface of the support is 10% or less, and a ratio of an area occupied by the Al crystal grain having the (γ) to the total area of the surface of the support is 50 to 84%.

7. An electrophotographic apparatus, comprising:

an electrophotographic photosensitive member comprising a support having a cylindrical shape, and a photosensitive layer;

a charging unit;

an exposing unit;

a developing unit; and a transferring unit, wherein the support has a surface comprising Al and/or an Al alloy, and comprising Al crystal grains having (α) a plane at −15° or more and less than +15° with respect to a {001} orientation, (β) a plane at −15° or more and less than +15° with respect to a {101} orientation, and (γ) a plane at −15° or more and less than +15° with respect to a {111} orientation, and a ratio of an area occupied by the Al crystal grain having the (α) to a total area of the surface of the support is 10% or less, and a ratio of an area occupied by the Al crystal grain having the (γ) to the total area of the surface of the support is 50 to 84%.

* * * * *